Fig. 1a.

Inventors:
Leonidas J. Jones,
Richard W. Rankin,
Everett L. Rivest,
by Marvin Snyder
Their Attorney.

United States Patent Office 3,500,559
Patented Mar. 17, 1970

3,500,559
ELECTRONIC SYSTEM FOR ACCEPTING AND PROCESSING RESPONSES TO QUESTIONS PRESENTED TO STUDENTS
Leonidas J. Jones and Richard W. Rankin, Scotia, and Everett L. Rivest, Schenectady, N.Y., assignors to General Electric Company, a corporation of New York
Filed Sept. 11, 1967, Ser. No. 666,663
Int. Cl. G09b 7/06
U.S. Cl. 35—48                    23 Claims

ABSTRACT OF THE DISCLOSURE

A system for recording and correlating signals from student response stations which incorporates both lock-step and non-lock-step modes of operation. The system includes provision for insertion of problem numbers individually at each response station, allowing each student to answer questions not only at his own pace but in any order. Student identification numbers may also be inserted at each station. Data is formatted for recording or transmission directly to a remote computer.

BACKGROUND OF THE INVENTION

This invention relates to electronic teaching aids, and more particularly to a student response system wherein, at the teacher's option, each one of a large plurality of students may respond to stimuli such as questions presented to the group of students, each student answering the questions in any order and at his own pace.

Student response systems, or systems for testing students by use of machines or electronic apparatus have been developed for the purpose of improving efficacy of teaching. However, widespread acceptance of such systems has not occurred as rapidly as anticipated. One impediment to extensive acceptance heretofore has been the requirement that each student answer each question in the order presented, and that a subsequent question not be presented until either all students have responded to the preceding question or sufficient time has elapsed for the teacher to move on to the next question despite the fact that all students may not yet have made a response to the preceding question. Although this mode of operation is useful under particular circumstances, under other circumstances it can hinder learning by causing disinterest and boredom because of the inflexible order in which questions must be answered and the necessity of adjusting to a speed slow enough to allow the slower students sufficient time to answer each of the questions presented. The present invention is intended to obviate these drawbacks so as to permit each student to register his responses electronically to a group of questions at his own pace and in any order he chooses, which group of questions may be different from those presented to other students and even related to different subjects, while still providing facility to operate in the mode whereby all students must respond to questions in the same order and within the time allocated by the teacher. The latter mode is herein designated "lock-step" operation, while the mode in which each student can answer the particular group of questions presented to him at his own pace and in any order is herein designated "non-lock-step" operation. The present invention provides the teacher with the option of operating in either the lock-step or non-lock-step mode. It should be noted that the term "student", as used herein, is intended to designate a group of students as well as an individual student, since it is possible for a group of students to collectively respond to questions at a single response station.

SUMMARY OF THE INVENTION

Briefly, in accordance with a preferred embodiment of the invention, a system for permitting students to electronically record their responses to a plurality of questions is provided. This system comprises a plurality of remote stations, each adapted to be operated by a student and including accumulator means for recording a response by the student to each of the questions and means for generating a manifestation to identify each of the questions as it is responded to. Circuit means are provided for producing a manifestation to identify each station, and storage means responsive to the accumulator means, the generating means and the circuit means are also provided for recording as a single message from only those stations in which a response is contained in the accumulator means, the response made to a question, the identity of the question to which the response has been made, and the identity of the remote station making the response.

Accordingly, one object of the invention is to provide a system for electronically recording and correlating responses made by each of a plurality of students to a group of questions presented to them in common in which each student may answer the questions in any order and at his own pace.

Another object is to provide a system for electronically recording responses made by each of a plurality of students to a group of questions presented to them in common in which, at the teacher's option, the system can be operated in a lock-step or non-lock-step mode.

Another object is to provide a system for electronically recording and correlating responses made by different students to respectively different groups of questions.

Another object is to provide a student response system in which wiring between individual remote stations and between the teacher's control console and the individual remote stations is greatly minimized.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF THE PREFERRED EMBODIMENTS

Figure 1A:
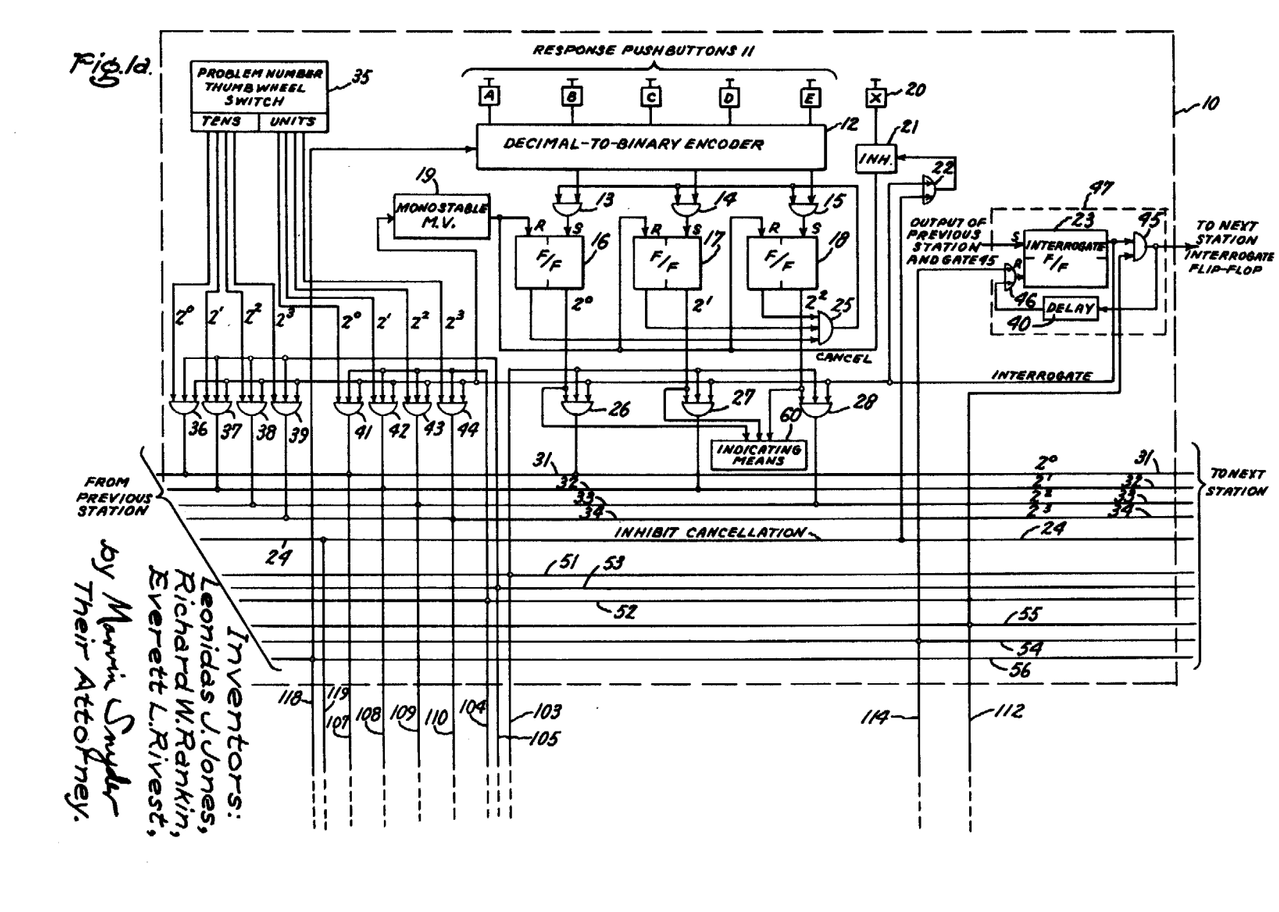
FIGURE 1A is a block diagram of a typical remote station for the student response system of the instant invention.

In FIGURE 1A, remote station 10, also referred to as a student station, is shown having five response pushbuttons 11 labeled A through E, each pushbutton making contact only while it is depressed. Each response pushbutton is connected to a decimal-to-binary encoder 12 which furnishes output signals through three separate leads to three separate AND gates 13, 14 and 15 respectively, in binary fashion. Gate 13 represents the $2^0$ digit, gate 14 represents the $2^1$ digit and gate 15 represents the $2^2$ digit. Outputs of each of AND gates 13, 14 and 15 are coupled to the set inputs S of flip-flop circuits 16, 17 and 18, respectively. A sixth pushbutton 20 is provided for performing a cancel function upon the response made most recently, prior to transfer of the response data from the remote station to the control apparatus. The cancel function is performed by energizing the reset inputs R of each of flip-flop circuits 16, 17 and 18 simultaneously. The cancel function performed by pushbutton 20 may be inhibited by means of an INHIBIT gate 21 which is actuated by an OR circuit 22. Actuation of INHIBIT gate 21 occurs whenever an interrogate flip-flop circuit 23 is actuated to interrogate the student station or whenever an "inhibit cancellation" bus 24 is energized by the teacher through a lead 119 from an energizing switch 101, illustrated in the control apparatus of FIGURE 1B. Bus 24 may or may not be energized during either non-lock-step operation or lock-step operation, at the teacher's option. A monostable multivibrator 19 is connected to the output of interrogate flip-flop circuit 23 and performs the function of resetting each of flip-flop circuits 16, 17 and 18, after their conditions have been interrogated, by furnishing a pulse to reset inputs R of flip-flop circuits 16, 17 and 18 upon completion of each interrogate pulse produced by flip-flop circuit 23.

An AND gate 25 is connected to receive output signals from flip-flop circuits 16, 17 and 18 when in the reset condition only, so as to produce an output signal only when all three of these flip-flop circuits are in the reset condition. This output signal fulfills a second input to each of AND gates 13, 14 and 15, permitting flip-flop circuits 16, 17 and 18 to acquire data from encoder 12. Output signals from circuits 16, 17 and 18, when in the set condition, are furnished to one input of each of response AND gates 26, 27 and 28 respectively, as well as to indicator means 60 which may comprise a plurality of lamps energized through conventional binary-to-decimal decoding means so that each lamp indicates whether an associated one of pushbuttons 11 respectively has been depressed. These lamps are preferably recessed so as to be hidden from view from everyone except the student at that station, and provide to that student a verification of the answer he has selected. This verification is continuous until the student either cancels his answer or his station is interrogated by the system. If desired, the signals from each station energizing the respective indicator lamps may be summed and furnished to separate meters (not shown) which read current furnished by the students in toto to each of the five indicator lamps. If each meter is calibrated in percentage, the teacher can obtain an immediate reading of the percentage of students selecting any of the possible answers to each of the questions presented.

A second input to each of AND gates 26, 27 and 28 is energized by the "interrogate" signal produced by interrogate flip-flop circuit 23 when in the set condition, permitting transfer of data stored in flip-flop circuits 16–18 to common buses 31, 32 and 33 at the proper time as determined by energization of a third input to each of AND gates 26, 27 and 28 from line 103 through bus 51. Although only five response pushbuttons are illustrated for simplicity, it is clear that up to seven may be utilized. Furthermore, by addition of another AND gate similar to gates 13–15, which can set another flip-flop circuit similar to flip-flop circuits 16–18, and with the output of the additional flip-flop circuit coupled to bus 34, up to fifteen response pushbuttons may be utilized.

Figure 1B:
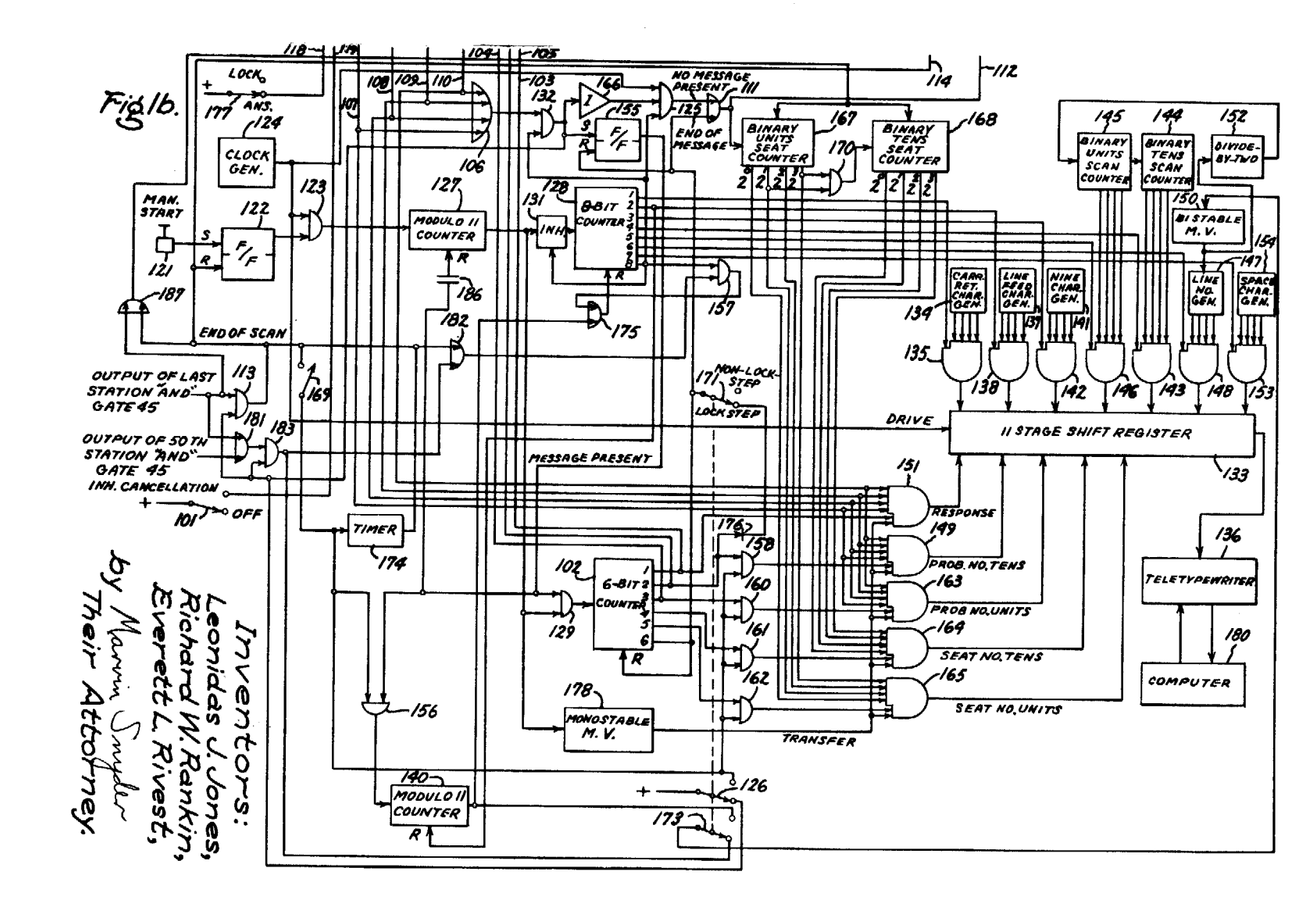
FIGURE 1B is a block diagram of the control apparatus at the teacher's console for the student response system of the instant invention.
Figures 2, 3:
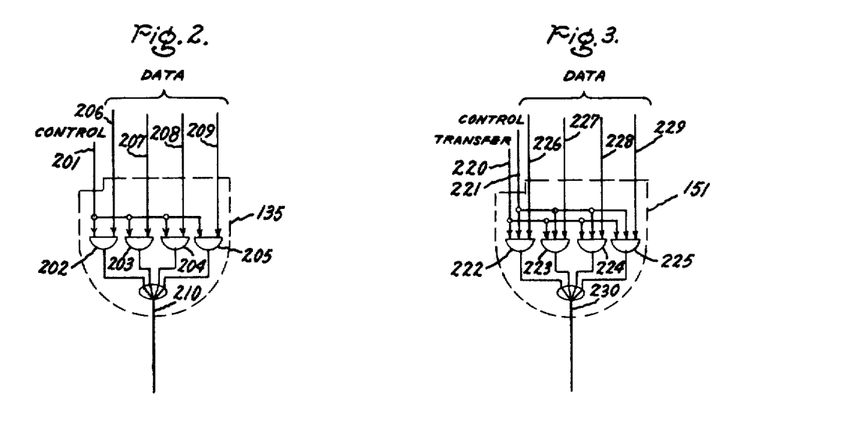
FIGURE 2 is a block diagram illustrating apparatus within one type module shown in the control apparatus of FIGURE 1B.
FIGURE 3 is a block diagram illustrating apparatus within a second type of module shown in the control apparatus of FIGURE 1B.

At each student station a problem number encoding device or selector switch, such as a thumbwheel switch 35, is provided. This switch, which preferably comprises an independently-operated switch for each decimal digit, produces a binary encoded output representing the digits of a problem number. To meet the requirements of the control apparatus shown in FIGURE 1B, the output leads of switch 35 are grouped into conventional decimal designations of a tens group and a units group, and are used for indicating up to 99 different problem numbers. Of course, this capability may be expanded by use of a three-section thumbwheel switch if desired. Each section of problem number thumbwheel switch 35, i.e. each of the two separate switches comprising the thumbwheel switch, is binary coded to produce responses from 0 to 9. Output signals from thumbwheel switch 35 are furnished over each of the four output leads from the tens and units sections of the thumbwheel switch to a plurality of tens AND gates 36, 37, 38 and 39, and units AND gates 41, 42, 43 and 44, respectively. Output signals from AND gates 36 and 41 are furnished to $2^0$ digit bus 31, output signals from AND gates 37 and 42 are furnished to $2^1$ digit bus 32, output signals from AND gates 38 and 43 are furnished to $2^2$ digit bus 33 and output signals from AND gates 39 and 44 are furnished to a $2^3$ digit bus 34. Buses 31–34, as well as buses 24 and 51–53, are common to each of the remote stations in the student response system. Each group of response AND gates 26, 27 and 28, units AND gates 41, 42, 43 and 44, and tens AND gates 36, 37, 38 and 39, passes signals at a different time, as determined by the output of a 6-bit counter 102 situated in the control apparatus, as illustrated in FIGURE 1B, and energizing buses 51, 52 and 53 through leads 103, 104 and 105, respectively. Output signals from buses 31–34 are supplied to the respective inputs of a 4-input OR gate 106 situated in the control apparatus shown in FIGURE 1B, and to the four data inputs of a response module 151. The circuitry of module 151 is illustrated in FIGURE 3 and described, infra. Output signals from buses 31, 32, 33 and 34 are supplied to the control apparatus of FIGURE 1B through leads 107, 108, 109 and 110, respectively.

Output signals from interrogate flip-flop circuit 23, in addition to being supplied to an input of each of AND gates 26–28, are also supplied to one of the inputs of each of AND gates 36–39 and 41–44 and to one input of a 2-input AND gate 45. The second input to AND gate 45 is fulfilled by a common bus 55 energized by output signals of an OR gate 111, in the control apparatus of FIGURE 1B, which produces an output signal on lead 112 whenever either the entire message of remote station 10 has been transferred to the control apparatus or no message is present in station 10. Output signals from AND gate 45 are furnished to the set input S of the interrogate flip-flop circuit of the remote station intended to be interrogated next, and are also furnished to the reset input R of flip-flop circuit 23, after a brief delay introduced by a delay circuit 40, through an OR circuit 46. In addition, reset input R of flip-flop circuit 23 is also energzed through OR circuit 46 whenever, in the lock-step mode, one scan of all the remote stations has been completed, resulting in a signal on common bus 54 furnished through lead 114 from an AND gate 113 in the control apparatus of FIGURE 1B. However, at the first remote station to be scanned, bus 54 is connected to the set input S of interrogate flip-flop circuit 23, and only the delayed output signal from AND gate 45 is furnished to the reset input R of interrogate flip-flop circuit 23. Thus, at the end of each scan of the remote stations, in the lock-step mode, the interrogate flip-flop circuit of the first remote station is in the set condition while the interrogate flip-flop circuit of each of the other remote stations is in the reset condition. At the first remote station however, there is no connection between the output of interrogate flip-flop 23 and the input to OR gate 22, so that flip-flop 23 does not inhibit cancellation. This station may be used by the teacher to enter the correct answer to each question into the system. The set condition of the interrogate flip-flop circuit is then advanced through each of the remote stations as they are scanned so that, in each of the remote stations, interrogate flip-flop circuit 23 along with AND gate 45, OR gate 46 and delay means 40, function as a single stage 47 of what comprises a shift register for advancing a single bit through each of its stages. In the final remote station to be scanned, output signals of AND gate 45 are furnished to the set input S of interrogate flip-flop circuit 23 in the first remote station to be scanned, enabling successive scanning of the remote stations without interruption. However, in the lock-step mode scanning must be reinstituted each time a scan of all the remote stations has been completed.

In the control apparatus of FIGURE 1B, a manual start pushbutton 121 provides a momentary contact which energizes the set input S of a flip-flop circuit 122 which, when in the set condition, furnishes an output signal to one input of a 2-input AND gate 123. Reset signals are furnished to the reset input R of flip-flop circuit 122 in the lock-step mode from the output of AND gate 113 at the end of each scan, since the inputs of AND gate 113 are then fulfilled by the output signal from AND gate 45 of the last remote station and by the lock-step mode position of a 2-position energiizing switch 126. In the non-lock-step mode, flip-flop circuit 122 can be reset by energizing the reset input R through a timer 174, or by manually closing a switch 169.

A switch 177 is also provided in the control apparatus having both a "lock" and an "ans." position. When in the "ans." position, energization is furnished through a lead 118 to a bus 56 common to all the student stations. This bus is connected to decimal-to-binary encoder 12, and permits energization of flip-flop circuits 16–18 in each of the respective stations. If the teacher desires to limit the amount of time to be taken by the students in answering each question in the lock-step mode, he need merely move switch 177 to the "lock" position at the expiration of an interval allowed for the students to make their responses to a question. At this time, the students cannot change their responses, since they cannot energize AND gates 13–15 from encoder 12, and an interrogate scan of the stations may be initiated by depressing pushbutton 121. To prevent cancellation after expiration of the time limit to answer a question, switch 177 may be ganged with switch 101, so that denergization of encoder 12 can occur simultaneously with energization of bus 24. Alternatively, these functions may be accomplished automatically merely by operating switch 177, together with switch 101 if desired, from a timer (not shown). This feature finds its major utility in the lock-step mode, wherein each question must be answered within a predetermined time interval.

A continuously operating clock pulse generator 124 furnishes pulses to the second input of AND gate 123 and one input of a 3-input AND gate 125, at a frequency selected to meet the data rate requirements of the system. AND gate 123 drives a modulo 11 counter 127 which, in turn, advances an 8-bit counter 128 by one step each time eleven pulses from AND gate 123 have been counted. In addition, output signals from modulo 11 counter 127 are supplied to one input of a 2-input AND gate 129. Modulo 11 counter 127 is necessary because the student response system is intended to be used, for example, with a teletypewriter employing asynchronous coding such as promulgated by the American Standards Association under the designation "American Standard Code for Infromation Interchange" (ASCII), which requires 11 bits per character, although other coding can be provided if desired. Thus, modulo 11 counter 127 demarcates groups of pulses, each group sufficient to permit generation of but a single character, by producing an output pulse upon occurrence of every eleventh clock pulse. Therefore, 8-bit counter 128 is advanced one step by modulo 11 counter 127 each time the interval required for generation of one character has elapsed.

An INHIBIT gate 131 is connected between the output of counter 127 and the input to counter 128 in order to prevent output signals of counter 127 from reaching the input of counter 128 when counter 128 is in its eighth output condition. When counter 128 is in the eighth output condition, and assuming no message is present on leads 107–110, the second input of AND gate 125 is energized through an inverting amplifier 166 by an output signal from an AND gate 132 having a first input coupled to the output of OR gate 106, while the third input to AND gate 125 and the second input to AND gate 132 are energized by counter 128. When operating in the lock-step mode however, the input to inverter 166 is continuously energized by switch 126, thereby preventing AND gate 125 from producing an output signal.

The system herein described formats the data to be sent to a remote computer so that the data appears to have been generated by the appropriately selected apparatus. The formatting described herein for illustrative purposes resembles that generated by a teletypewriter terminal. Accordingly, the system generates line numbers, carriage returns, line feeds, etc. Although other control characters or formats required for different computer input requirements may also be furnished, the teletypewriter format is presented here merely as an example, for clarity, of the format utilized when a teletypewriter comprises the computer interface apparatus. In the alternative, suitable computer interface apparatus includes many types of well-krown data recording and data transmitting equipment, with a wide range of operating speeds.

Each of the first seven output conditions of 8-bit counter 128 initiates application of a separate character to an 11-stage shift register 133, which is driven continuously by clock generator 124. Thus, with 8-bit counter 128 in the first output condition, a carriage return character produced by carriage return character generator 134 is gated through a module 135 to shift register 133. The circuitry of module 135 is illustrated in FIGURE 2 and described, infra.

Eleven clock pulses later, the carriage return character has been serially shifted out of shift register 133 to a teletypewriter 136 connected thereto or to a paper tape punch and reader which may be associated with the teletypewriter, or to a computer 180 connected thereto which may be in parallel with teletypewriter 136 or bypassed around the teletypewriter. Computer 180 may conveniently comprise a General Electric 265 Time-Sharing Computer using Time-Sharing Fortran Language. When the carriage return character is shifted out of shift register 133, 8-bit counter 128 switches to its second output condition, causing a line feed character to be gated from a line feed character generator 137 through a module 138 to shift register 133. The second output condition of 8-bit counter 128 also resets a modulo 11 counter 140, which is utilized only in a non-lock-step mode of operation. Eleven clock pulses later, the line feed character has been transmitted out of shift register 133 and 8-bit counter 128 advances to its third output condition, so that the "9" produced by a nine character generator 141, is gated through a module 142 to the shift register.

Eleven clock pulses later, the character "9" has been completely shifted out and 8-bit counter 128 switches to its fourth output condition, gating a module 143 to accept an output signal from a binary tens scan counter 144. This scan counter, together with a binary units scan counter 145 which drives counter 144, comprises a manually resettable counter to enable the teacher to keep track of the number of scans of the plurality of remote stations. When operating in the lock-step mode, the number represented by scan counters 144 and 145 corresponds to the question number, provided both counters 144 and 145 have been set to zero at the time presentation of the questions is begun. However, in the non-lock-step mode the scan counters merely keep track of every pair of successive data lines, which may correspond to lines typed by the teletypewriter, and therefore may be switched into an inoperative condition, if desired.

After the tens scan character has been completely shifted out of shift register 133, 8-bit counter 128 switches to its fifth output condition, and a module 146 is thereby gated to pass the units character from scan counter 145 into shift register 133. After eleven more clock pulses have elapsed, the units scan character has been shifted out and 8-bit counter 128 switches into its sixth output condition, gating a line number character from a line number generator 147 through a module 148 into the shift register. Assuming that each line of data is to contain fifty characters plus a five character line address, a class of 100 students would require two lines of data to record the single digit responses made by each student to one question. Thus, line number generator 147 comprises a character generator capable of generating a "1" and a "2," alternately. The character "1" or "2" is selected by pulses produced by a bistable multivibrator 150; that is, each output pulse from multivibrator 150 changes the character produced by line number generator 147, so that successive pulses produce alternate characters. Multivibrator 150 in turn is driven through an OR gate 181 in series with an AND gate 183, which is energized by switch 126, and through a switch 173, by the output of AND gates 45 in the fiftieth and the last remote stations to be scanned when the system is operated in the lock-step mode. Multivibrator 150 is driven through switch 173 by modulo 11 counter 140 when the system is operated in the non-lock-step mode. The output of bistable multivibrator 150 is also coupled to the input of a divide-by-two circuit 152, such as a flip-flop, the output of which drives binary units scan counter 145. Thus, for every two output pulses produced by bistable multivibrator 150, binary scan counters 144 and 145 increase the scan count contained therein by a single digit or unit. In lock-step operation, this increase in the scan count represents completion of another scan, while in non-lock-step operation this increase merely indicates completion of another two lines of data. More than two lines per scan can be obtained by substituting an appropriate modulus counter for circuit 152 and bistable multivibrator 150, and by altering line number generator 147 to produce the corresponding characters. This is appropriate for larger class sizes.

After the line number character ("1") has been shifted out of shift register 133, 8-bit counter 128 advances to its seventh output condition, gating a module 153 to transfer a space character from a space character generator 154 into shift register 133. After shift register 133 has shifted out the space character, the format has been established and the results of scanning the remote stations can now be transmitted. Thus, eleven clock pulses after the space character is transferred into shift register 133, 8-bit counter 128 advances to its eighth output condition, energizing the third input to AND gate 125 and the second input to AND gate 132. In addition, INHIBIT gate 131 is energized, preventing further pulses produced by modulo 11 counter 127 from reaching counter 128.

Assuming a message is present on leads 107–110 while 8-bit counter 128 is in its eighth output condition, 4-input OR gate 106 furnishes a signal through AND gate 132 to the set input S of a flip-flop circuit 155, the output of which thereupon produces a signal indicating that a message is present. This "message present" signal not only energizes the second input to AND gate 129, the output of which drives 6-bit counter 102, but also provides a momentary pulse as through a capacitor 186 to reset modulo 11 counter 127 to zero, and also energizes one input of an AND gate 156, the output of which drives modulo 11 counter 140. During this time, only one input to a 2-input AND gate 157 is energized, since 8-bit counter 128 dwells in its eighth output condition. The second input to AND gate 157 is energized, during lock-step operation, by production of an output signal through an OR gate 182 from the fiftieth and the last station AND gates 45 and, during non-lock-step operation, also by a signal produced either by timer 174 or closing of switch 169.

Each pulse produced by modulo 11 counter 127 advances the output condition of 6-bit counter 102 by one step. The output of modulo 11 counter 127 also initiates a pulse to a transfer input on module 151 and on modules 149, 163, 164, and 165 which are substantially identical electrically to module 151. Thus, with counter 102 in its first output condition, a control or gating signal is furnished therefrom to module 151 which, upon occurrence of a short duration transfer pulse initiated upon the rise of each output pulse from modulo 11 counter 127, accepts output signals from buses 31–34 and furnishes them to shift register 133. Because the transfer pulse, generated by a one-shot or monostable multivibrator 178, is supplied concurrently with the gating signal to module 151, the transfer pulse is also supplied concurrently with a signal energizing the third inputs to each of AND gates 26–28, so that the data signal received by module 151 corresponds to the response represented by the output signals of flip-flop circuits 16–18 in station 10 wherein interrogate flip-flop circuit 23 is in the set condition. After completion of the transfer pulse, which is of much shorter duration than the output pulse provided by counter 127, 6-bit counter 102 advances to its second output condition. Eleven clock generator pulses later, as determined by modulo 11 counter 127, the response character has been entirely shifted, in serial fashion, out of shift register 133. In its second output condition, 6-bit counter 102 energizes an input to each of AND gates 36–39, so that the tens numeral of the problem number furnished by thumbwheel switch 35 is supplied to the input of module 149. The gating signal for module 149 is supplied by the output of a two-input AND gate 158 having one of its inputs fulfilled by the output of 6-bit counter 102 when in its second output condition. However, the second input to 2-input AND gate 158 is fulfilled when energizing switch 126 is in the non-lock-step position; in the lock-step position, the second input to AND gate 158 and to 2-input AND gates 160, 161, and 162 respectively, are not fulfilled. Thus, in the lock-step mode, when 6-bit counter 102 is in its second condition, module 149 is not gated and hence can supply no output signal to shift register 133. Similarly, 6-bit counter 102 in its third, fourth, and fifth output conditions fulfills the first input to each of AND gates 160, 161, and 162 respectively, although output signals can be produced by these AND gates only when the second inputs thereto are energized by switch 126 being in the non-lock-step mode position. Hence, modules 163, 164, and 165, gated by output signals from AND gates 160, 161, and 162 respectively, can furnish output signals to shift register 133 only when switch 126 is in the non-lock-step position.

Whenever 6-bit counter 102 advances, in the lock-step mode, to its second output condition, an "end of message" signal is furnished through unilateral conducting means such as a diode 176, in series with switch 171 which is ganged with switch 126, to an input of OR gate 111. Simultaneously, flip-flop circuit 155 receives a reset signal and 6-bit counter 102 receives a reset signal. At this time, AND gate 45 in student station 10 receives an output signal from OR gate 111 through lead 112 and bus 55, thereby providing an output signal to the interrogate flip-flop circuit of the next student station and resetting flip-flop circuit 23 of station 10 through delay means 40 and OR gate 46. Completion of the "interrogate" signal from flip-flop circuit 23 drives monostable multivibrator 19, which resets flip-flop circuits 16–18, thereby clearing the response accumulator means at the student station. In addition, 6-bit counter 102 reverts to its first condition in response to a reset signal from switch 171, thereby gating the response received from the next student station through module 151 into shift register 133. This occurs upon the next transfer pulse from monostable multivibrator 178 eleven clock pulses after the previous response has been furnished to shift register 133, so that the previous response has been entirely shifted out of shift register 133 when the next response is supplied to the shift register. When 6-bit counter 102 is again advanced to its second output condition, it is again reset through unilateral conducting means 176 and switch 171, while an "end of message" signal is furnished to OR gate 111 and thence to AND gate 45 of the student station just interrogated in order to initiate interrogation of the next successive student station. Thus, when operated in the lock-step mode utilization means comprising either or both teletypewriter 136 and computer 180, after being formatted, receive the response made by each of the student stations, in sequential order. The responses are furnished to teletypewriter 136 if a printed record of the responses is desired, and to computer 180 in order to facilitate evaluation and analysis of the responses. The computer may then produce a printed record of the evaluated data on the teletypewriter. Moreover, because 6-bit counter 102 is actuated only to its first and second output conditions when the system is operated in the lock-step-mode, it is not necessary that the student set his problem number thumbwheel switch 35 to the problem which he is answering; the problems are presented in order and must be answered in order. The problem number per se is ignored by the system when in lock-step operation. Similarly, although seat counters 167 and 168 also keep track of the particular student station being interrogated by advancing the count therein by one each time an output pulse is produced by OR gate 111, a response is made by each student station in sequential order during each scan in the lock-step mode. Hence, the seat number per se is also ignored by the system when in the lock-step mode, and 6-bit counter 102 is always in either its first or second output condition.

When the fiftieth student station has been interrogated, one complete line on the teletypewriter paper has been filled with response characters. An output signal is thus taken from AND gate 45 of the fiftieth station and supplied to AND gate 183 through OR gate 181. The resulting output pulse produced by AND gate 183 is passed through switch 173, which is ganged with switch 126, to drive bistable multivibrator 150 so as to change the line number character in line number generator 147 from a "1" to a "2." Simultaneously, the output pulse of AND gate 183 is furnished through OR gate 182 to the second input of AND gate 157, thereby resetting 8-bit counter 128. The 8-bit counter then counts through its eight output conditions, generating the following characters in order: carriage return, line feed, "9," scan tens digit, scan units digit, line number ("2"), and space. Flip-flop circuit 155 is then set through AND gate 132, permitting 6-bit counter 102 to gate the response of the fifty-first student station through module 151 into shift register 133. Operation then continues as previously described, until the final station, which may be the fifty-first through one hundredth station, has been interrogated. An output-signal is then taken from AND gate 45 of the last station and supplied to AND gate 113 and an OR gate 187. An "end of scan" signal is thus produced by AND gate 113, energizing the second input to AND gate 157 through OR gate 182 and thereby resetting 8-bit counter 128 through OR gate 175. Moreover, the "end of scan" signal resets flip-flop circuit 122, de-energizing the first input to AND gate 123 and thereby halting operation of modulo 11 counter 127; in addition, the line number character in line number generator 147 is changed back to a "1" by a pulse from bistable multivibrator 150 initiated by the output signal of the last station AND gate 45 through OR gate 181 and AND gate 183, the count of the binary scan counters is advanced by one digit since divide-by-two circuit 152 has been actuated twice by multivibrator 150, and each of interrogate flip-flop circuits 23 in the student stations, with the exception of the interrogate flip-flop circuit of the first student's station, is reset through the respective OR gate 46 coupled thereto. The interrogate flip-flop circuit of the first student station is actuated to its set condition by the "end of scan" signal through lead 114 and bus 54 however, so that the student stations may respond in proper sequence starting with the first student station when the next scan is initiated.

If, in the lock-step mode, a student has failed to make a response so that no message is detected at the time his station is interrogated, the input to inverter 166 nevertheless remains energized through switch 126, preventing premature advancement of the system to interrogate the next station. In addition, flip-flop circuit 155 is simultaneously held in its set condition thereby, so that counter 102 continues to receive driving pulses through AND gate 129. Thus, the de-energized state of buses 31, 32, and 33 results in a predetermined response character, such as "0," being furnished to shift register 133. Hence, in the lock-step mode, a response is recorded for each of the stations, regardless of whether a response has been made by the student at that station. This allows correlation of responses with the associated student stations in the lock-step mode, without need for any additional characters to identify the stations.

When operated in the non-lock-step mode, switch 171 disconnects the sixth count output of 6-bit counter 102 from AND gate 158. Switch 126, which is ganged with switch 171, furnishes continuous energization to the second inputs of each of AND gates 156, 158, and 160–162 and, if desired, energizes a timer 174, the output of which is connected to the output of AND gate 113 to furnish an "end of scan" signal to the system. Switch 173, which is also ganged with switches 171 and 126, disconnects the output of the fiftieth and last station AND gates 45 from the input to bistable multivibrator 150 and instead connects the output of modulo 11 counter 140 thereto.

Although in the lock-step mode it is not necessary that the student set his problem number thumbwheel switch 35 to the problem which he is answering, since the problems are not specifically numbered by the system but are presented in order and must be answered in order, it is necessary that the problem number thumbwheel switch be set to the number of the problem being answered whenever the system is operated in the non-lock-step mode since, in this mode of operation, the problem numbers and responses must be correlated for each individual student. When operating in the non-lock-step mode, the stations are being continually scanned and, if switch 101 should be in the "off" condition, the student may not know when his station is being scanned by the system. He then cannot know whether his CANCEL pushbutton 20 is effective or not in cancelling an answer, even if he does operate his CANCEL pushbutton and then answers the question. The computer however can be programmed to accept only his last answer to each question and reject all his previous answers thereto, so that no errors can result even if a previous answer was already recorded at the time he selected a new answer. Programming of this type also enables the student to change an answer long after he selected his original answer, merely by resetting the problem number on his thumbwheel switch and making a new response.

Switch 101 energizes bus 24 which produces an "inhibit cancellation" signal to OR circuit 22, thereby actuating INHIBIT gate 21 to prevent any functioning of pushbutton 20. Hence, the teacher may eliminate the cancel function in lock-step or non-lock-step operation, merely by leaving switch 101 in the off or de-energized position.

In non-lock-step operation, 8-bit counter 128 functions in the manner previously described, counting down to its eighth output condition in order to establish the line format as described for use on teletypewriter 136. When the eighth condition is reached, INHIBIT gate 131 stops further input signals from being applied to 8-bit counter 128. Flip-flop circuit 155 is in the set condition since, at the onset of its operation, 6-bit counter 102 is in its first output condition so that AND gates 26–28 of remote station 10 furnish output signals to buses 31–33 when flip-flop circuit 23 of station 10 is in its set condition. Hence, both inputs to AND gate 132 are energized, and a "message present" signal is furnished from flip-flop circuit 155 to one input of each of AND gates 129 and 156, assuming a response to a question has actually been made at station 10. This response is gated into shift register 133 through module 151 upon occurrence of a transfer pulse from monostable multivibrator 178, in the manner previously described, and counter 102 then shifts into its second output condition. The next output signal produced by modulo 11 counter 127 occurs immediately after the entire response character has been shifted out of shift register 133, and initiates a transfer pulse to module 149; hence, the signals on buses 31–34 representing, in binary code, the decimal tens numeral of the problem number, because of output signals produced by AND gates 36–39 in response to the second output condition of 6-bit counter 102, are supplied to shift register 133. After completion of the transfer pulse, 6-bit counter 102 switches into its third output condition, energizing an input to each of AND gates 41–44, and the binary encoded decimal units numeral of the problem number is supplied to the input of module 163 which receives a gating signal through AND gate 160. The next output pulse from modulo 11 counter 127 initiates a transfer pulse from multivibrator 178 which is also furnished to module 163, so that the units numeral of the problem number is inserted into shift register 133 immediately after the tens numeral of the problem number has been shifted out. After completion of the transfer pulse from multivibrator 178, 6-bit counter 102 switches into its fourth output condition. When teletypewriter 136 is driven by shift register 133, it can be seen that after printing the response from a particular student station, the teletypewriter prints the problem number tens numeral and then the problem number units numeral, indicating the number of the problem which has been answered by the student at that station.

An AND gate 170 couples the output of binary units seat counter 167 to the input of binary tens seat counter 168, thereby advancing the condition of the binary tens seat counter by one digit each time the binary units seat counter has counted ten pulses. Each of the seat counters resets itself to zero upon reaching the count of ten. In addition, the seat counters are reset by an output signal from AND gate 113 or from the last station AND gate 45 through OR gate 187. With 6-bit counter 102 in its fourth output condition, AND gate 161 furnishes a gating signal to module 164. Upon initiation of the next output pulse from modulo 11 counter 127, the tens numeral furnished by binary tens seat counter 168 is transferred through module 164 into shift register 133, and is thereupon shifted out by the time the next eleven successive clock pulses have been completed. In addition, after completion of the transfer pulse from multivibrator 178, 6-bit counter 102 is advanced to its fifth output condition. In the fifth output condition, AND gate 162 furnishes a gating signal to module 165 so that, when the next transfer pulse occurs, the units numeral furnished by binary units seat counter 167 is gated through module 165 into shift register 133 and, eleven clock pulses later, the units numeral is shifted out, completing the message from the student station interrogated. After completion of the transfer pulse, 6-bit counter 102 is advanced to its sixth output condition. Thus, when operated in the non-lock-step mode, each response made by a student station is represented by a five character message wherein the first character is the response to a problem, the second character is the tens numeral of the problem, the third character is the units numeral of the problem, the fourth character is the numeral representing the tens digit of the seat number, and the fifth character is the numeral representing the units digit of the seat number.

With 6-bit counter 102 in its sixth output condition, OR gate 111 receives an "end of message" input signal therefrom, advancing seat counter 167 by one count. The sixth output condition of counter 102 also causes the counter to reset to its first output condition, energizing bus 51 through lead 103. Seat counters 167 and 168 continue to be advanced by pulses from OR gate 111 at the clock frequency rate of one seat per pulse. Until a response signal at an interrogated station is detected on buses 31–33 through OR circuit 106, inverter 166 receives no input signal and thus energizes the second input to AND gate 125. Upon occurrence of each clock pulse, provided no response is detected at the station being interrogated, all three inputs to AND gate 125 are energized and a "no message present" signal is furnished to OR gate 111 which, in turn, energizes the second input to AND gate 45 of the interrogated station. AND gate 45 thereby resets interrogate flip-flop circuit 23, causing monostable multivibrator 19 to reset flip-flop circuits 16–18 of the interrogated station, and also initiates interrogation of the next student station. Seat counters 167 and 168 thus continue to advance with each output pulse from OR gate 111 until a response from an interrogated station is found present on buses 31–33, at which time an output signal from OR gate 106 through AND gate 132 de-energizes the second input to AND gate 125 by energizing the input to inverter circuit 166, thereby causing cessation of output signals from AND gate 125. Simultaneously, the signal from AND gate 132 sets flip-flop circuit 155. Thus, the count extant in binary units and tens counters 167 and 168 respectively, at any time, represents the seat number or student station number which is being interrogated. When flip-flop circuit 155 is switched into the set condition, modulo 11 counter 127 is reset to zero, and the "message present" signal furnished to AND gate 129 permits modulo 11 counter 127 to again drive 6-bit counter 102. By the time the next output signal from counter 127 occurs, sufficient time has elapsed for the units digit of the seat number of the previous station interrogated to have shifted out of shift register 133, so that the signal from counted 127 initiates a transfer pulse from monostable multivibrator 178 to module 151 which thereupon transfers the response of the station presently being interrogated into shift register 133. After completion of the transfer pulse from monostable multivibrator 178, counter 102 advances to its second output condition.

Each "message present" signal furnished through AND gate 156 advances modulo 11 counter 140 by one count. Thus, when the tenth message has been recorded by teletypewriter 136, the next "message present" signal causes modulo 11 counter 140 to supply an output signal to bistable multivibrator 150 which generates a new line number and advances the count contained in binary scan counters 144 and 145. In addition, 8-bit counter 128 is reset through OR gate 175, so that a new line is formatted.

When an output signal is produced by the last station AND gate 45, interrogate flip-flop circuit 23 of the first remote station is driven thereby into its set condition, and another interrogation scan of the remote stations is thus begun. Operation continues until either timer 174 produces an output signal indicating expiration of the time allocated in which to answer all the problems presented, or the instructor manually energizes lead 114 and bus 54 by closing switch 169. In either event, the second input to AND gate 157 is energized, so that 8-bit counter 128 is reset through OR gate 175. Energizing lead 114 also resets flip-flop circuit 122, thereby halting operation of modulo 11 counter 127 so that no further information can be furnished to shift register 133. However, any information extant in the shift register at this instant will be transmitted to the utilization means because of the continued energization of the shift register drive line from clock generator 124. In addition, the units and tens seat counters 167 and 168 are reset through OR gate 187, and all interrogate flip-flop circuits of the student stations are actuated to the reset condition except that of the first station wherein bus 54 is connected to the set input S thereof along with an output from the last station AND gate 45. In order to reinitiate operation, manual start pushbutton 121 must again be depressed.

Problem number thumbwheel switch 35, together with response pushbuttons 11 if desired, provide added facility for identification of either or both the student at a particular remote location and the set of questions the student is working on. This is accomplished at a predetermined time, such as prior to the divulgence of the questions to the student. Thus, the student may insert his assigned identification number by setting two digits on his thumbwheel switch and, if desired, adding a third digit as represented by a response pushbutton. After the response pushbutton has been depressed, the system interrogates the student stations in the manner previously described. For large identification numbers, this procedure may be repeated for the additional digits, until enough digits to correspond to the number of digits present in each student identification number have been read into the utilization means. In this fashion, the student at any particular station or seat is identified. Next, the set of questions to be answered by the student may be supplied to the utilization means in the same manner. At this juncture, the system is ready to accept answers to the questions presented to the students.

To briefly recapitulate operation of the system, consider first the lock-step mode. The student's response is made through pushbuttons 11, furnishing set signals, according to an order determined by encoder 12, to flip-flop circuits 16–18 through AND gates 13–15 respectively. Once a response has been made, at least one of flip-flop circuits 16–18 is switched into the set condition, so that AND gate 25 no longer produces an output signal to AND gates 13–15. Therefore, any further response is inhibited until either the student station has transferred its response data to the control apparatus or cancel pushbutton 20 has been depressed; either operation resets flip-flops 16–18 and thereby extinguishes the visual indication of the response displayed to the student by indicator means 60.

Readout occurs after manual start pushbutton 121 is depressed, permitting clock generator 124 to drive modulo 11 counter 127 through AND gate 123. Thus, 8-bit counter 128 is driven by each output pulse from modulo 11 counter 127, so as to furnish, in sequence, to shift register 133 and thence to the utilization means comprising either or both teletypewriter 136 and computer 180, a carriage return signal from carriage return character generator 134 through module 135, a line feed signal from line feed character generator 137 through module 138, the decimal numeral "9" from nine character generator 141 through module 142, a scan number in tens and units digits from counters 144 and 145, respectively through modules 143 and 146 respectively, a line number character from line number generator 147 through module 148, and a space character from space character generator 154 through module 153. The next count of 8-bit counter 128 actuates INHIBIT gate 131 so that subsequent output pulses from modulo 11 counter 127 are prevented from reaching counter 128. At this juncture, the proper format has been established to receive a line of responses from student stations which are to be scanned sequentially.

The eighth condition of 8-bit counter 128 permits AND gate 132 to pass an output signal generated by OR circuit 106, in response to signals from flip-flop 16–18 through AND gates 26–28 respectively, to the set input S of flip-flop 155. This results in application of a "message present" signal to one input of AND gate 129, permitting output pulses from modulo 11 counter 127 to drive 6-bit counter 102, 6-bit counter 102 is initially in the first output condition so as to gate module 151 to pass the response signal from AND gates 26–28 into shift register 133 upon occurrence of the next transfer pulse, or output pulse from monostable multivibrator 178 initiated by a pulse from modulo 11 counter 127. The pulse from counter 127 also advances counter 102 to its second output condition and, through switch 171, thereby actuates AND gate 45 in the student station which has just been interrogated so as to drive the interrogate flip-flop of the next student station into the set condition in order to permit interrogation of AND circuits 26–28 in the next station. Simultaneously, AND gate 45 provides an output signal through an OR gate 46 after a very brief delay introduced by delay circuit 40, thereby resetting interrogate flip-flop 23.

After reaching its second output condition, 6-bit counter 102 immediately resets itself to its first output condition through diode 176 in series with switch 171. Hence module 151 again receives a gating signal from counter 102 and AND gates 26–28 of the station being interrogated supply an indication of the student response to module 151 which transfers the response into shift register 133 upon occurrence of the next transfer pulse from multivibrator 178. Thus, in the lock-step mode of operation, each time 6 bit counter 102 is in its first output condition, a response from another student station is supplied to shift register 133, and this occurs after every 11th pulse produced by clock generator 124. When the last student station has been interrogated, AND gate 113 produces an output signal which, through AND gate 157 and OR gate 175 resets 8-bit counter 128 to its first output condition, and through lead 114 and bus 54 sets interrogate flip-flop circuit 23 of the first student station and resets interrogate flip-flop circuit 23 of all the other student stations. In addition, the output signal of AND gate 113 resets flip-flop circuit 122, thereby halting operation of the scanning circuitry by preventing further clock pulses from reaching modulo 11 counter 127. Thus, when manual start pushbutton 121 is again depressed, another complete scan of all student stations occurs.

Although it is not necessary to keep track of either the problem number or student station number when in the lock-step mode because the problems are presented in numerical sequence and the stations are interrogated in numerical sequence, this is necessary in non-lock-step operation because any student may answer any problem in any order he pleases and at any time during the examination as he pleases. When in the non-lock-step mode of operation, the station number is automatically tracked by the control apparatus; however, the student must set the problem number on his problem number thumbwheel switch 35 prior to answering that problem by depressing one of his response pushbuttons 11. Moreover, if the teacher desires to prevent the students from attempting to cancel any responses, an "inhibit cancellation" signal is furnished from switch 101 through bus 24 and OR gate 22 to INHIBIT gate 21 in order to prevent cancel pushbutton 20 from affecting the student's response. Switch 101 is intended to provide this function in the non-lock-step mode, the lock-step mode, or both, at the option of the teacher.

In the non-lock-step mode, the system is placed into operation by depressing manual start pushbutton 121, thereby setting flip-flop circuit 122 and permitting modulo 11 counter 127 to be driven by pulses from clock generator 124 through AND gate 123. As in the lock-step mode of operation, 8-bit counter 128 steps through to its eighth condition, establishing the proper data control format in the process. However, in the non-lock-step mode of operation, AND gates 158, 160, 161 and 162 each have one of their two inputs energized through switch 126, thereby permitting 6-bit counter 102 to produce gating signals to modules 149, 163, 164 and 165 in sequence. Counter 102 resets itself when in the sixth output condition, and is prevented from energizing gate 160 through switch 171 at this time by use of unilateral conducting means 176, here indicated as a diode.

In the non-lock-step mode of operation, data is formatted through shift register 133 in accordance with operation of 8-bit counter 128 in the manner described for the lock-step mode of operation, leaving counter 128 in its eighth output condition. A "message present" signal supplied by flip-flop circuit 155 energizes AND gate 129 to permit 6-bit counter 102 to be driven by output pulses from modulo 11 counter 127. In addition, each "message present" signal produced by flip-flop 155 resets modulo 11 counter 127 and advances the condition of modulo 11 counter 140 through AND gate 156 by one step. Preparatory to receiving "message present" pulses from flip-flop circuit 155, modulo 11 counter 140 is reset to zero when 8-bit counter 128 reaches its second output condition.

When a "message present" signal is furnished to AND gate 129, the student response from the first station in which a response has been made is furnished through module 151 into shift register 133 after eleven clock pulses have elapsed, as determined by modulo 11 counter 127 and monostable multivibrator 178, and is thence transmitted to the utilization means. Each time modulo 11 counter 127 produces another output pulse, counter 102 is advanced through its output conditions so as to enable transfer in sequence, through modules 149, 163, 164 and 165, the tens numeral of the problem number, the units numeral of the problem number, the tens numeral of the seat number and the units numeral of the seat number respectively. This transfer occurs only upon production of an output pulse from monostable multivibrator 178 which permits the aforementioned modules to supply their respective data to shift register 133 and thence to either or both teletypewriter 136 and computer 180. The sixth output condition of 6-bit counter 102 drives counter 102 into the reset condition, simultaneously resetting flip-flop 155 and advancing the number registered by counters 167 and 168 by one. In addition, AND gate 45 of the station just interrogated produces an output signal to the interrogate flip-flop of the next station, and resets interrogate flip-flop 45 at its own station after a brief delay. If no message is present in the next station, this condition is sensed because bus 51 initiates readout of AND gates 26-28 of the next station onto buses 31-33. If no message is present, inverter circuit 166 receives no input signal, thereby fulfilling one of the inputs to AND gate 125 which produces a "no message present" signal to OR circuit 111. Thus, seat counters 167 and 168 are again advanced by a single digit and AND gate 45 of the station just interrogated produces an output signal to the next student station interrogate flip-flop circuit and resets its own interrogate flip-flop circuit after a brief delay.

When ultimately a station containing a message is interrogated, AND gate 132 is energized and flip-flop 155 is again driven into the set condition, producing a "message present" input signal to AND gates 129 and 156. The response portion of the message is furnished through module 151 to shift register 133 upon occurrence of a transfer pulse from monostable multivibrator 178. Thereafter, 6-bit counter 102 is advanced by modulo 11 and counter 127 to its second output condition, enabling the tens numeral of the problem number to be furnished to shift register 133. This continues as previously described, until the "end of message" signal is produced by the sixth output condition of 6-bit counter 102, whereupon the next student station is interrogated. After ten "message present" pulses have been furnished through AND gate 156 to modulo 11 counter 140, 8-bit counter 128 is reset through OR circuit 175, and bistable multivibrator 150 drives line number generator 147 to the next character. Since each message contains five characters, it can be seen that modulo 11 counter 140 prevents the line typed by the teletypewriter from continuing beyond the margin of the sheet on which it is printed.

When operating in the non-lock-step mode, the output signal produced by AND gate 45 of the last station furnishes a set input to interrogate flip-flop 23 of the first student station, so that interrogation continually takes place at all the student stations in sequence, until flip-flop 122 is reset either by a signal supplied manually at the option of the teacher or by a signal produced by timer 174. This reset signal, moreover, places interrogate flip-flop circuit 23 of the first student station in the set condition and the interrogate flip-flop circuits of all the remaining student stations in the reset condition, assuring that the next time manual start pushbutton 121 is depressed, scanning begins with the first station. At each remote station, multivibrator 19 resets flip-flops 16-18 after the station has been interrogated, thereby clearing the accumulator means so that the student may make a response to the next question.

FIGURE 2 is a diagram to illustrate connections made within modules 135, 138, 142, 143, 146, 148 and 153 of FIGURE 1B, with module 135 illustrated as a typical example. A gating input 201 is furnished thereto, fulfilling a first input to each of four 2-input AND gates 202, 203, 204 and 205. The second input to each of AND gates 202, 203, 204 and 205 is fulfilled by a data input lead 206, 207, 208 and 209 respectively. The output lead of each of the AND gates is furnished through a cable 210, indicated by a single output line from module 135. No output signals can be procured by module 135 unless a gating signal is present on control lead 201; in such case, any data signals supplied by leads 206, 207, 208 and 209 are produced at the output of module 135.

FIGURE 3 is a diagram to illustrate connections made within modules 151, 149, 163, 164 and 165 of FIGURE 1B, with module 151 illustrated as a typical example. A gating input 221 is furnished thereto, fulfilling a first input to each of four 3-input AND gates 222, 223, 224 and 225. A transfer input 220 is also furnished thereto, originating at the output of monostable multivibrator 178 of FIGURE 1B and fulfilling a second input to each of the four 3-input AND gates. The third input to each of AND gates 222, 223, 224 and 225 is fulfilled by a data input lead 226, 227, 228 and 229 respectively. The output lead of each of the AND gates is furnished through a cable 230, indicated by a single output line from module 151. No output signals can be produced by module 151 unless a gating signal is present on control lead 221 in the presence of a pulse on transfer lead 220; in such case, any data signals supplied by leads 226, 227, 228 and 229 are produced at the output of module 151.

Figure 4:
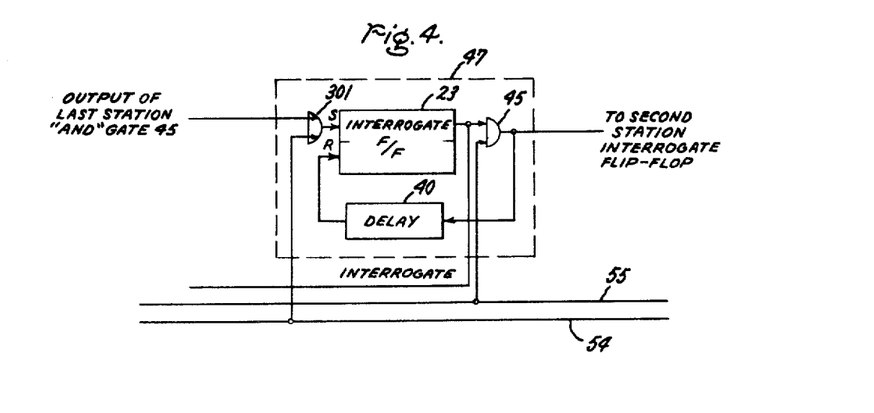
FIGURE 4 is a block diagram illustrating a portion of the apparatus employed in the first student station to be scanned.

In FIGURE 4, a portion of the interrogating circuitry including circuit 47 of the first student station to be scanned is illustrated. Thus, interrogate flip-flop circuit 23 produces output signals to one input of AND gate 45, the second input of which is fulfilled by a connection to bus 55. Output signals from AND gate 45 are furnished to the second station interrogate flip-flop circuit and also to delay circuit 40 of the first student station to be scanned. The apparatus described thus far is identical to that in all the student stations. However, output signals from delay circuit 40 are supplied directly to the reset input R of interrogate flip-flop circuit 23. Clock signals from bus 54, rather than being furnished to the reset input of interrogate flip-flop circuit 23 in the first student station to be scanned, are instead furnished through an OR circuit 301 to the set input S of interrogate flip-flop circuit 23. A second input to OR gate 301 is furnished from the output of the last station AND gate 45.

When operated in the lock-step mode, each "end of scan" signal sets flip-flop circuit 23 through OR gate 301 from bus 54. Similarly, when operated in the non-lock-step mode, a pulse produced by timer 174 or switch 169 in the circuit of FIGURE 1B also serves to switch interrogate flip-flop circuit 23 into its set condition through bus 54. Hence, upon completion of any predetermined interval, which in the lock-step mode is of but a single scan in duration, interrogate flip-flop circuit 23 of the first remote station to be scanned is switched into the set condition. This enables scanning to be resumed, beginning with the first student station, whenever manual START pushbutton 121 of the control apparatus of FIGURE 1B is depressed. When operating in the non-lock-step mode however, the output of the last station AND gate 45 continually sets interrogate flip-flop circuit 23. This permits sequential interrogation of each of the student stations to continue indefinitely, until switch 169 is closed or timer 174 produces an output pulse.

The foregoing describes a system for electronically recording responses made by each of a plurality of students to common or different questions presented to them, in which each student may answer the particular group of questions presented to him in any order and at his own pace. The system electronically records responses made by each of the plurality of students to the questions. At the teacher's option, the system can be operated in a lock-step or non-lock-step mode of operation. Wiring between individual remote stations and between the teacher's control console and the individual remote station is greatly minimized in this system. The system is highly amenable to fully automatic operation in response to prerecorded commands, with questions presented automatically in audible or visual form.

While only certain preferred features of the invention have been shown by way of illustration, many modificationstions and changes will occur to those skilled in the art. It is, therefore, to be understood that the appended claims are intended to cover all such modifications and changes as fall within the true spirit and scope of the invention.

What we claim as new and desire to secure by Letters Patent of the United States:

1. A system for electronically registering responses to stimuli presented to subjects, each said stimuli having a plurality of possible responses, said system comprising:
   a plurality of response stations, each of said response stations adapted to be manually operated by a subject and including accumulator means for temporarily storing a signal indicative of the chosen response by said subject to each stimulus and means for generating a manifestation to identify said each stimulus as said each stimulus is responded to;
   interrogation means actuating each of said stations in sequential order to produce a manifestation identifying said each station upon being actuated, said manifestation in response to said interrogation means being independent of the presence of a chosen response at each station; and
   gating means responsive to said accumulator means, said generating means, and said interrogation means, for correlating said responses and said manifestations.

2. The system of claim 1 including computer means coupled to said gating means for storing and processing said responses and said manifestations.

3. The system of claim 2 including formatting means coupled to said computer means for preparing said computer means to accept said responses and said manifestations.

4. The system of claim 1 wherein said accumulator means comprises a plurality of bistable circuits and means for actuating said biastable circuits in accordance with a predetermined binary code to produce a binary coded output from said bistable circuits corresponding to the response chosen by said subject.

5. A sys'em for permitting students to electronically record their response to a plurality of questions each having a plurality of possible responses, said system comprising:
   a plurality of remote stations, each of said remote stations adapted to be operated by a student and including register means for registering a response by said student to any of said questions and means for generating a signal to identify each of said questions as said each question is responded to;
   circuit means producing a signal to identify said each station; and
   storage means responsive to said register means, said generating means and said circuit means, for recording as a single message from only those stations in which a response is contained in the register means, the response made to said each question, the identity of said each question to which said response has been made, and the identity of the station at which said response has been made.

6. The system of claim 5 including means coupled to said register means for displaying visibly an indication of the response made to said each question.

7. The system of claim 5 wherein said storage means includes computer means for storing and processing each of said single messages.

8. A system for permitting students to electronically record their responses to a plurality of questions each having a plurality of possible responses, said system comprising:
   a plurality of remote stations, each of said remote stations adapted to be operated by a student and including register means for registering response by said student to any of said questions and means for generating a signal to identify each of said questions as said each question is responded to;
   scanning means for interrogating said remote stations in sequence;
   circuit means producing a signal to identify said each station upon being scanned; and
   storage means responsive to said register means, said generating means, and said circuit means, for recording as a single message the response made to said each question, the identify of said each question to which said response has been made, and the identity of the station at which said response has been made, said storage means being activated for recording only during the scanning of those stations having a response recorded subsequent to the prior scan of said station.

9. The system of claim 8 including timing means coupled to said scanning means for halting sequential interrogation of said remote stations after a predetermined time.

10. The system of claim 8 wherein said storage means includes a teletypewriter having a paper tape punch and reader associated therewith.

11. The system of claim 8 wherein said storage means includes computer means for storing and processing responses made at each of said stations.

12. The system of claim 11 including formatting means coupled to said computer means for preparing said computer means to accept messages from each of said stations making a response.

13. The system of claim 8 wherein said register means comprises a plurality of bistable circuits and means for actuating said bistable circuits in accordance with a predetermined code.

14. The system of claim 13 including means for resetting said register means, said resetting means being responsive to said scanning means.

15. The system of claim 8 wherein said scanning means includes a bistable circuit at said each station, each said bistable circuit being coupled to the register means at said each station respectively, said bistable circuit at said each station being coupled to said bistable circuit at a successive station for actuating the bistable circuit at said successive station after the register means at said each station has been interrogated.

16. The system of claim 8 wherein said scanning means includes gating means responsive to the register means at said each station as said each station is scanned and initiating interrogation of the next successive station immediately upon detection of a no response condition in the register means at said each station.

17. The system of claim 8 wherein said generating means is manually adjustable at said each station independently of the generating means at any other of said stations.

18. The system of claim 17 wherein said circuit means is responsive jointly to said scanning means and said register means at each station as said each station is scanned.

19. The system of claim 18 including switching means coupled to said scanning means for operating said system in a lock-step mode, said switching means being operable to continuously maintain said generating means in a de-energized condition and to increase the rate of sequential interrogation by said scanning means to a level allowing sufficient time for said storage means to record only response data from every one of said stations.

20. The system of claim 8 including cancelling means coupled to said register means for cancelling the recorded response in said register means, and inhibiting means coupled to said cancelling means for preventing operation of said cancelling means.

21. The system of claim 8 including means coupled to said register means for preventing said register means from recording a response.

22. A system for electronically recording data at a central location, said system comprising:
 a plurality of remote stations, each of said remote stations including means for registering data therein and input means responsive to data supplied thereto, at least one of said remote stations adapted to be manually operated by a subject in response to stimuli each having a plurality of possible responses, said manually operated remote station generating a manifestation to identify each stimuli presented to said subject as said each of said stimuli is responded to;
 interrogation means actuating each of said stations in predetermined order to produce a manifestation identifying said each station upon being actuated, said interrogation means including a bistable circuit at each station coupled to said data registering means, said bistable circuit at each station being coupled to said bistable circuit at a successive station for actuating the bistable circuit at the successive station after the data registering means at said each station has been interrogated; and
 gating means responsive to said remote stations and said interrogation means for correlating data registered at said remote stations with said manifestations.

23. The system of claim 22 including computer means coupled to said gating means for storing and processing said data received from said remote stations and said manifestations.

References Cited

UNITED STATES PATENTS

| | | | |
|---|---|---|---|
| 3,186,110 | 6/1965 | Smyth | 35—11 |
| 3,270,438 | 9/1966 | Ephraim. | |
| 3,266,174 | 8/1966 | Bechtol et al. | 35—11 |
| 3,300,876 | 1/1967 | Johannsen | 35—9 |
| 3,303,472 | 2/1967 | Chalker et al. | 340—172.5 |
| 3,314,172 | 4/1967 | Boyett | 35—48 |
| 3,344,408 | 9/1967 | Singer et al. | 340—172.5 |
| 3,399,469 | 9/1968 | Nisbet | 35—48 |

EUGENE R. CAPOZIO, Primary Examiner

W. H. GRIEB, Assistant Examiner

U.S. Cl. X.R.

340—172.5